United States Patent [19]

Byer et al.

[11] Patent Number: 5,355,247
[45] Date of Patent: Oct. 11, 1994

[54] METHOD USING A MONOLITHIC CRYSTALLINE MATERIAL FOR PRODUCING RADIATION BY QUASI-PHASE-MATCHING, DIFFUSION BONDED MONOLITHIC CRYSTALLINE MATERIAL FOR QUASI-PHASE-MATCHING, AND METHOD FOR FABRICATING SAME

[75] Inventors: Robert L. Byer, Stanford; Martin M. Fejer; Leslie A. Gordon, both of Palo Alto, all of Calif.

[73] Assignee: The Board of Trustees of the Leland Stanford, Jr. University, Stanford, Calif.

[21] Appl. No.: 40,018

[22] Filed: Mar. 30, 1993

[51] Int. Cl.$^5$ ............................................. G02F 1/39
[52] U.S. Cl. ................................. 359/330; 359/326; 372/22
[58] Field of Search .................. 359/326–332; 372/21, 22; 385/122

[56] References Cited

U.S. PATENT DOCUMENTS

| | | | |
|---|---|---|---|
| 3,384,433 | 5/1968 | Bloembergen | 359/328 |
| 3,982,135 | 9/1976 | van der Ziel | 359/328 |
| 5,033,810 | 7/1991 | Inoue et al. | 359/332 X |
| 5,036,220 | 7/1991 | Byer et al. | 359/328 |
| 5,048,905 | 9/1991 | Fejer et al. | 385/130 |
| 5,059,001 | 10/1991 | Shimizu | 359/328 X |
| 5,241,413 | 8/1993 | Uenishi et al. | 359/328 |
| 5,247,528 | 9/1993 | Shinozaki et al. | 372/22 |

OTHER PUBLICATIONS

Armstrong, J. A., et al., "Interactions between Light Waves in a Nonlinear Dielectric", Phys. Rev., vol. 127, No. 6, Sep. 15, 1962, pp. 1918–1939.

Broberg, Björn, et al., "1.54–$\mu$m phase-adjusted InGaAsP/InP distributed feedback lasers with mass-transported windows", Appl. Phys. Lett., vol. 47, No. 1, Jul. 1, 1985, pp. 4–6.

Fejer, M. M., et al., "Quasi-Phase-Matched Second Harmonic Generation: Tuning and Tolerances", IEEE J. Quantum Electronics, vol. 28, No. 11, Nov. 1992, pp. 2631–2654.

Franken, P. A., et al., "Optical Harmonics and Nonlinear Phenomena", Rev. Mod. Phys., vol. 35, No. 1, Jan. 1963, pp. 23–39.

Liau, Z. L., et al., "A novel technique for GaInAsP/InP buried heterostructure laser fabrication", Appl. Phys. Lett., vol. 40, No. 7, Apr. 1, 1982, pp. 568–570.

Lim, E. J., et al., "Second–harmonic generation of green light in periodically poled planar lithium niobate waveguide", Electron. Lett., vol. 25, No. 3, Feb. 2, 1989, pp. 174–175.

Lim, E. J., et al., "Blue light generation by frequency doubling in periodically poled lithium niobate channel waveguide", Electron. Lett., vol. 25, No. 11, May 25, 1989, pp. 731–732.

Magel, G. A., et al., "Quasi–phase matched second–harmonic generation of blue light in periodically poled LiNbO$_3$,", Appl. Phys. Lett., vol. 56, No. 2, Jan. 8, 1990, pp. 108–110.

Mao, Hongwei, et al., "Noncritical quasiphase–matched second harmonic generation in LiB$_3$O$_5$ crystal at room temperature", Appl. Phys. Lett. vol. 61, No. 10, Sep. 7, 1992, pp. 1148–1150.

(List continued on next page.)

Primary Examiner—John D. Lee
Attorney, Agent, or Firm—Flehr, Hohbach, Test, Albritton & Herbertg

[57] ABSTRACT

A monolithic crystalline material for quasi-phase-matching is described. The material includes a plurality of wafers of an odd multiple of coherence length thickness, having their faces bonded together by diffusion bonding. The wafers are oriented relative to one another to alternate their signs of nonlinear susceptibility. The invention also includes a method for producing optical radiation of a selected frequency by quasi-phase-matching, several specific methods and materials based on the discovery responsible for the invention, a generator for radiation of 60 THZ frequency of significant power, and a method of fabricating the material.

30 Claims, 4 Drawing Sheets

OTHER PUBLICATIONS

Liau, Z. L., et al., "Fabrication, Characterization, and Analysis of Mass-Transported GaInAsP/InP Buried-Heterostructure Lasers", IEEE J. Quantum Electronics, vol. QE-20, No. 8, Aug. 1984, pp. 855-865.

Liau, Z. L., et al., "Gallium phosphide microlenses by mass transport", Appl. Phys. Lett., vol. 55, No. 2, Jul. 10, 1989, pp. 97-99.

Liau, Z. L., et al., "Wafer fusion: A novel technique for optoelectronic device fabrication and monolithic integration", Appl. Phys. Lett., vol. 56, No. 8, Feb. 19, 1990, pp. 737-739.

Lo, Y. H., et al., "Bonding by atomic rearrangement of InP/InGasAsP 1.5 µm wavelength lasers on GaAs substrates", Appl. Phys. Lett., vol. 58, No. 18, May 6, 1991, pp. 1961-1963.

McMullen, J. D., "Optical parametric interactions in isotropic materials using a phase-corrected stack of nonlinear dielectric plates", J. Appl. Phys., vol. 46, No. 7, Jul. 1975, pp. 3076-3081.

Rustagi, K. C., et al., "Optical Frequency Conversion in Quasi-Phase-Matched Stacks of Nonlinear Crystals", IEEE J. Quantum Electronics, vol. QE-18, No. 6, Jun. 1982, pp. 1029-1041.

Szilagyi, A., et al., "A quasi-phase-matching technique for efficient optical mixing and frequency doubling", J. Appl. Phys., vol. 47, No. 5, May 1976, pp. 2025-2032.

Tajima, Hidemi, et al., "Performance of Composite Glass Slab Laser", IEEE J. Quantum Electronics, vol. 28, No. 6, Jun. 1992, pp. 1562-1569.

Thompson, D. E., et al., "Second-harmonic generation in GaAs 'stack of plates' using high-power $CO_2$ laser radiation", Appl. Phys. Lett., vol. 29, No. 2, Jul. 15, 1976, pp. 113-115.

Lee, H. C., et al., "Diffusion bonded composites of YAG single crystals" (unpublished), Dec. 1991, submitted for publication in SPIE Proceedings vol. 1624, 8 pages.

METHOD USING A MONOLITHIC CRYSTALLINE MATERIAL FOR PRODUCING RADIATION BY QUASI-PHASE-MATCHING, DIFFUSION BONDED MONOLITHIC CRYSTALLINE MATERIAL FOR QUASI-PHASE-MATCHING, AND METHOD FOR FABRICATING SAME

The research from which this invention emanated was supported wholly or partly by the United States government, and such government may have rights in and to this invention.

BACKGROUND OF THE INVENTION

The present invention relates to nonlinear optics and, more particularly, to a method using a monolithic monocrystalline material for producing radiation of a selected frequency by quasi-phase-matching, a monolithic monocrystalline material which optimizes nonlinear interactions by quasi-phase-matching, and a method of fabricating the same. It also relates to an optical generator utilizing such material.

The properties of nonlinear materials have many different applications; the invention uses these properties for frequency conversion. That is, nonlinear monocrystalline materials can interact with input radiation to generate output radiation of a frequency different than that of the input radiation. The input and output radiation typically is optical radiation, i.e., radiation having frequencies in the visible range or of other adjacent frequency ranges such as ultraviolet, and infrared. It encompasses the ultraviolet, visible, and near, mid and far infrared frequencies. (The term "crystalline" as used herein without a modifier means "monocrystalline" unless the context indicates otherwise.)

Second harmonic generation is an example of one of the interactions possible in a nonlinear crystalline material. In second harmonic generation, the frequency ($\omega$) of input optical radiation is converted into optical radiation of twice such frequency ($2\omega$). A sum frequency generator also relies on frequency conversion in a nonlinear crystalline material. In such an arrangement, input beams of two different frequencies ($\omega_1$ and $\omega_2$) are summed by a nonlinear material to generate optical radiation whose frequency ($\omega_3$) is the sum of the frequencies of the two input beams ($\omega_1+\omega_2=\omega_3$). Other common devices utilizing a nonlinear monocrystalline material are optical parametric oscillators, optical parametric amplifiers and difference frequency generators.

Nonlinear frequency conversion in crystalline materials is used to provide a desired frequency which is not conveniently available from an existing source such as an existing laser. For example, it is used to "frequency double" the 10.6 $\mu$m radiation (approximately 30 THZ) generated by a $CO_2$ laser, to 5.3 $\mu$m (approximately 60 THZ). Currently there is no efficient or high power laser capable of generating the latter frequency. This frequency, however, is highly desirable because the atmosphere is transparent in the 3–7 $\mu$m spectral range. Application examples are remote sensing, laser radar and laser countermeasure systems.

Efficient nonlinear frequency conversion requires phase matching as will be described in some detail below. Because the frequency range in conventionally phase-matched crystals is limited by the birefringence available, consideration has been given to quasi-phase-matching as also described below. Reference is made, for example, to the papers entitled "Interactions Between Light Waves in a Nonlinear Dielectric" by J. A. Armstrong et al., *Physical Review*, Vol. 127, 1962, pp. 1918–1939; "Optical Harmonics and Nonlinear Phenomena" by A. Franken et al., *Review of Modern Physics*, Vol. 35, 1963, pp. 23–39; "A Quasi-Phase-Matching Technique for Efficient Optical Mixing and Frequency Doubling" by A. Szilagyi et al., *J. Appl. Physics*, Vol. 47, No. 5, May 1976, pp. 2025–2032; and "Second-Harmonic Generation in GaAs 'Stack of Plates' Using High-Power $CO_2$ Laser Radiation" by D. E. Thompson et al., *Appl. Phys. Lett.*, Vol. 29, No. 2, 15 Jul. 1976, pp. 113–115.

Quasi-phase-matching has been successfully achieved in ferroelectric nonlinear crystals in which domains can be inverted. (See "Quasi Phase Matched Second Harmonic Generation of Blue Light in Periodically Poled $LiNbO_3$" by G. A. Magel et al., *Appl. Phys. Lett.*, Vol. 56, 1990, pp. 108–110; and "Second Harmonic Generation of Green Light in Periodically Poled Planar Lithium Niobate Waveguide" by E. J. Lim et al., *Electronic Letters*, Vol. 25, 1989, pp. 174–175.) While this approach has been widely used for manufacturing waveguides in lithium niobate and other poleable materials, it is limited in that the technique is not possible in non-poleable materials. That is, a different approach is necessary to alternate the sign of the optical nonlinear coefficient in a non-poleable crystal.

Earlier approaches that have been considered for non-poleable materials required a multitude of thin slices of crystal. (See "A Quasi-Phase-Matching Technique for Efficient Optical Mixing and Frequency Doubling" by A. Szilagyi et al., *J. Appl. Physics*, Vol. 47, No. 5, May 1976, pp. 2025–2032; and "Second-Harmonic Generation in GaAs 'Stack of Plates' Using High-Power $CO_2$ Laser Radiation" by D. E. Thompson et al., *Appl. Phys. Lett.*, Vol. 29, No. 2, 15 Jul. 1976, pp. 113–115.) While good agreement was found between theory and experiment, the work was not continued for several reasons, including excessive reflection, scattering, and absorption losses caused by dust, surface quality and alignment tolerances. Thus, the number of air/material interfaces made this technique impractical. Because of this lack of practicality, those in the art have generally abandoned quasi-phase-matching as a general approach to bulk nonlinear conversion in non-poleable materials.

SUMMARY OF THE INVENTION

The present invention relates to a method of using quasi-phase-matching for frequency conversion in a practical way in all bulk nonlinear monocrystalline structures. The invention also provides a monolithic nonlinear monocrystalline material which is especially designed for quasi-phase-matching. In its broad aspects, the method includes providing a material made up of a plurality of adjacent wafers of one or more nonlinear monocrystalline materials that individually are transparent to the frequencies between which it is desired to transfer energy. (As used herein with respect to a material, the terms "transparent" and "low loss" means a material in which absorption of the radiation frequencies in question is not large enough to prevent nonlinear interactions from taking place with useful efficiency.)

Each of the wafers has a dimension along an expected optical path through it, which is selected to provide a desired conversion of energy from input radiation(s) to one or more selected frequencies of output radiation. Most desirably, such dimension of each of the wafers is generally equal to an odd multiple of the coherence length ($l_c$ as defined below) in the wafer for the desired energy conversion. Such wafers are bonded together by diffusion bonding to form a single (monolithic) monocrystalline material. Diffusion bonding is the permanent bonding together of adjacent surfaces where generally no foreign substance is present between such surfaces and there is a meaningful exchange or sharing of electrons, atoms, ions or molecules. It is achieved by mating the opposed adjacent faces of the wafers together, applying pressure between the same, and raising the temperature of the resulting stack to a temperature which will cause the meaningful migration between the wafers, and yet not be sufficiently high that the monocrystalline nature of the wafers is destroyed.

The temperature and pressure are maintained while the wafers are mated to one another for a sufficiently long period of time to have the migration occur. The pressure is necessary to prevent an air layer from remaining between the plates.

The method of the invention also includes the step of passing through the resulting material, radiation which will interact with the same nonlinearly to provide the desired output radiation. The invention includes an optical parametric oscillator method based on diffusion bonding quasi-phase-matching, the materials themselves and a method of fabricating the same. An optical generator for producing radiation of about 5.3 μm in wavelength is also provided as part of the invention.

The invention enables the practical use of nonlinear frequency conversion with non-poleable crystals. Thus, with it one can obtain new frequencies and yet take advantage of the many years of development of laser technology already spent. The costly process of inventing and perfecting new laser technology is avoided.

Other features and advantages of the invention either will become apparent or will be described in connection with the following, more detailed description of preferred embodiments of the invention.

BRIEF DESCRIPTION OF THE DRAWING

With reference to the accompanying drawing.

DETAILED DESCRIPTION OF THE PREFERRED EMBODIMENT(S)

The following relatively detailed description is provided to satisfy the patent statutes. However, it will be appreciated by those skilled in the art that various changes and modifications can be made without departing from the invention.

The discussion below is fairly complex, and the following definitions and understandings are used to circumvent confusion:

Interactions

When an interaction is referred to in this application, the interaction of two or more waves with a crystal is meant. For example, first order interaction is the linear response to light i.e. absorption, scattering; the frequency in equals the frequency out. $(\omega_1)_{in}=(\omega_2)_{out}$ A second order interaction involves three waves, either two frequencies in and one out, or one frequency in and two out. $(\omega_1+\omega_2)_{in}=(\omega_3)_{out}$ or $(\omega_1)_{in}=(\omega_2+\omega_3)_{out}$ The interaction coefficient is called the second order nonlinear coefficient, and determines how efficiently radiation is converted from the initial frequencies to the final frequencies. An example is second harmonic generation, or doubling the frequency where the two frequencies of the radiation beams in are identical, and the frequency of the radiation out is double the initial frequency of each of the input beams.

A third order interaction involves four waves: three frequencies in and one out, two in and two out, or one in and three out. $(\omega_1+\omega_2+\omega_3)_{in}=(\omega_4)_{out}$ or $(\omega_1+\omega_2)_{in}=(\omega_3+\omega_4)_{out}$ or $(\omega_1)_{in}=(\omega_2+\omega_3+\omega_4)_{out}$ The interaction coefficient is called the third order nonlinear coefficient, and once again determines conversion efficiency.

Phase Matching

Conservation of energy determines the interactions possible; the sum of the frequencies before the interaction equals the sum of the frequencies after the interaction. Conservation of momentum, or phase velocity matching, determines which one of those interactions dominates. When it is said that an interaction is phase matched it means that the sum of the wave vectors defined by the interaction equals zero. There is a wave vector, k, for each frequency in the interaction, where $k_\omega = \omega n_\omega / c$ for ω: frequency of the light in rad/sec n: index of refraction of the crystal at the frequency ω c: speed of light in a vacuum

Figure 1:
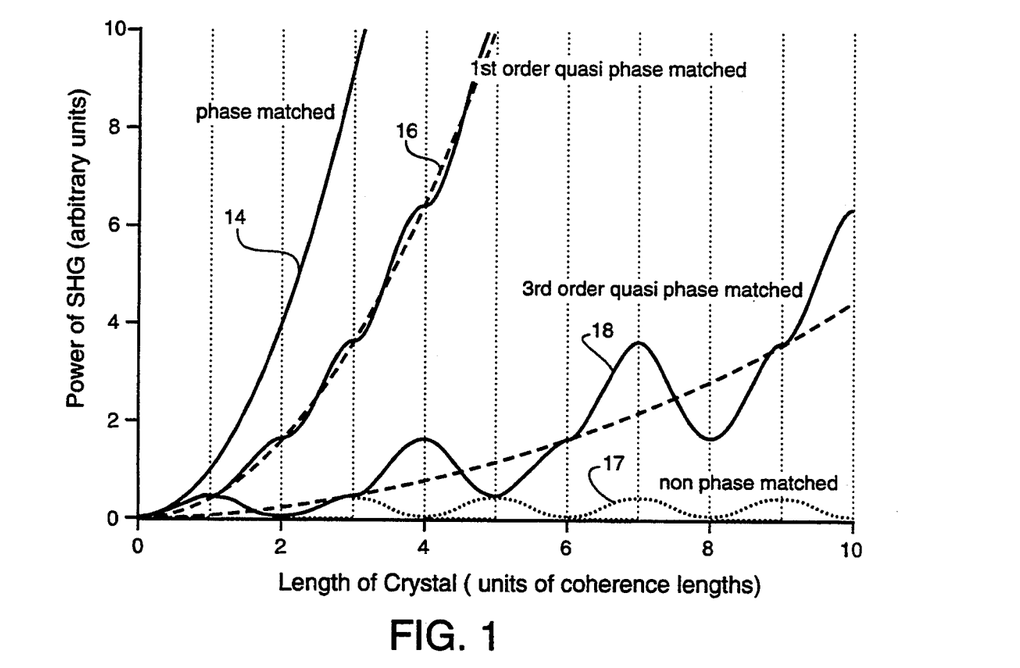
FIG. 1 is a graph illustrating no phase matching, birefringent phase matching, and 1$^{st}$ and 3$^{rd}$ order quasi-phase-matching.

To efficiently convert from initial frequencies to the final, an interaction must be phase matched as identified below. Without phase matching, the initial and final waves dephase by π radians after propagation through some length of the crystal. At this point, the flow of energy reverses, with the final frequencies depleted and the initial increased. The length of the crystal over which the initial and final waves dephase by π radians is called the coherence length, $l_c$, in this application. The coherence length depends on the crystal properties and the frequencies of the interaction. This situation is illustrated in FIG. 1 for the non-phase-matched curve in the case of second harmonic generation. Every $l_c$ the flow of energy reverses between the initial and the final frequencies; therefore, the maximum conversion possible in a non phase matched crystal is obtained in one coherence length, which is the half period of the growth and decay cycle of the final frequencies.

$$l_c = \pi / \Delta k$$

where Δk is the difference between the sum of wave vectors (k) of the initial frequencies and the final frequencies. In the case of very high conversion per layer the optimal thickness of the layer can vary from the above.

The following table provides examples of $\Delta k$ for different nonlinear interactions. (Each wave vector, k, conserves the sign of the frequency that it represents.)

| interaction | $\Delta k$ | device[1] |
|---|---|---|
| $(\omega_1 + \omega_2)_{in} = (\omega_3)_{out}$ | $k_3 - k_2 - k_1$ | SFG |
| $(\omega_1 + \omega_1)_{in} = (\omega_2)_{out}$ | $k_2 - k_1 - k_1$ | SHG |
| $(\omega_1)_{in} = (\omega_2 + \omega_3)_{out}$ | $k_3 + k_2 - k_1$ | OPO |
| $(\omega_1 - \omega_2)_{in} = (\omega_3)_{out}$ | $k_3 + k_2 - k_1$ | DFG |
| $(\omega_1 + \omega_2)_{in} = (\omega_3 + \omega_4)_{out}$ | $k_4 + k_3 - k_2 - k_1$ | |
| $(\omega_1)_{in} = (\omega_2 + \omega_3 + \omega_4)_{out}$ | $k_4 + k_3 + k_2 - k_1$ | |
| $(\omega_1 + \omega_2 + \omega_3)_{in} = (\omega_4)_{out}$ | $k_4 - k_3 - k_2 - k_1$ | |

[1]SFG = sum frequency generator
SHG = second harmonic generator
OPO = optical parametric oscillator
DFG = difference frequency generator The subscripts on the k's in the above correspond to the subscripts of the interaction frequencies ($\omega$). The first four examples are second order nonlinear interactions (three wave interactions) and the last three examples are third order nonlinear interactions involving four waves.

If the index of refraction was constant in a crystal, the same for all frequencies, then all interactions would be phase matched; however, the crystal exhibits dispersion and index of refraction does vary as a function of frequency, temperature, and other physical parameters. To offset the effects of dispersion, phase matching can be accomplished one of two ways: birefringent phase matching or quasi-phase matching.

Birefringent Phase Matching

Some crystals are not isotropic; they have different indices of refractions along different crystal axes, and are called birefringent. In this situation, frequencies of different polarizations will experience different indices of refraction. Tuning, or choosing the interaction can be accomplished by varying the temperature of the crystal and, therefore, changing the birefringence and the dispersion, or by changing the angle of propagation of one or more of the frequencies with respect to the crystal axes.

There are limitations to this type of phase matching. If tuning is accomplished by varying the angle of propagation with respect to the crystal axis, it is called "critical" phase matching; this type of phase matching is very sensitive to any angular deviation; therefore, has a very small angular acceptance, and the frequencies experience walk-off: where the electric fields of the initial and the final frequencies slowly separate, gradually reducing conversion efficiency. "Non-critical" phase matching is accomplished by propagating the frequencies at 90° to the optical axis. Tuning is accomplished by varying the temperature. The working range of frequencies of non-critical phase matching is much smaller than critical; however, it is always preferable when possible since it has a much larger angular acceptance and has no birefringent walk-off.

While some technology may be transferred from existing crystals, typically at least 15 years must be invested into developing growth techniques to produce quality crystals. For a crystal to be usable it must, among other properties: a) be low loss over the interaction wavelengths; b) have a sufficiently high optical nonlinear coefficient, and c) have an adequate birefringence to permit phase matching. Since conversion is dependent on the intensity, an ideal crystal must also have good thermal properties: a high damage threshold for high peak powers and high thermal conduction, and small absorption and scattering losses for high average powers.

Only a few crystals can be used for standard birefringent phase matching. For example, second harmonic generation of the output of a $CO_2$ laser has been shown for Te, $AgGaSe_2$, $AgGaS_2$, TlAsSe, Proustite, $ZnGeP_2$, and $CdGeAs_2$. Nonlinear crystals having a single index of refraction, such as GaAs or ZnSe, are not useful for standard phase matching due to their lack of birefringence. However, these crystals can be used, as well as those with birefringence, for harmonic conversion using quasi-phase-matching.

Quasi-Phase-Matching

The major constraint for conventional phase matching is birefringence since a birefringent crystal must possess adequate birefringence for the given interactions. Cubic nonlinear crystals, such as GaAs, can not be used for efficient bulk infrared frequency conversion because they do not have birefringence, and, therefore, do not allow birefringent phase matching. However, quasi-phase-matching (QPM) can overcome this limitation.

By periodically modifying the nonlinear coefficient, we introduce an additional wave vector, Km. Conservation of momentum now gives us $\Delta k = \Delta k - K_m$ where $\Delta k$ depends on the interaction and was defined previously. We see from this equation that by providing a $K_m$ that is equal to the $\Delta k$ of the interaction, we can achieve a $\Delta k = 0$. This is quasi-phase-matching.

It is possible to quasi-phase-match a crystal by changing the nonlinear coefficient every $l_c$ or odd multiple of $l_c$. This may be accomplished by either reversing the sign of the nonlinear coefficient of the alternating layers, or by alternating layers of material which possess a nonlinear coefficient with layers which have a different (preferably little or no) nonlinear coefficient. Such an alternate layer is inoperative—it could be of a polycrystalline material, but its thickness dimension remains relevant.

Figure 2:
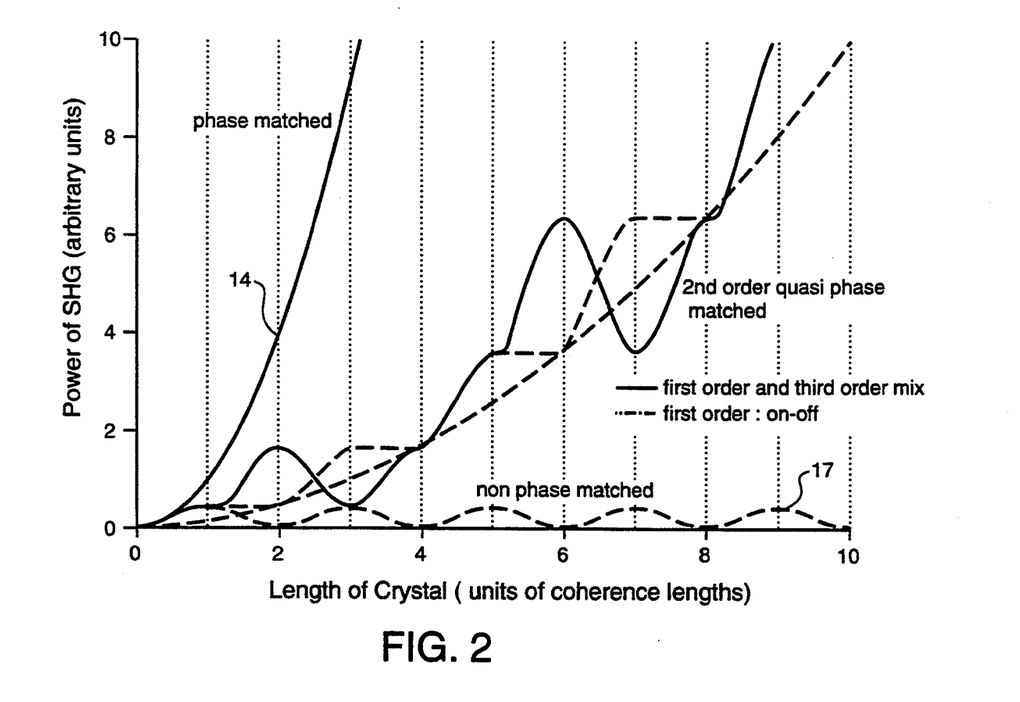
FIG. 2 is a graph similar to that of FIG. 1 illustrating even order and first order on-off quasi-phase-matching.

We will define the order of the quasi-phase-matched structure (m) as the average modulation with period $2ml_c$, where m is an integer. (The order of quasi-phase-matching is different than the order of interaction discussed previously.) Modulation is defined here as a complete growth and decay cycle of the final frequency. In this way, a structure composed of layers all one coherence length thick will be referred to as a first order (m = 1) quasi-phase-matched (QPM) crystal. Similarly, if it is composed of layers three coherence lengths thick, it will be a third order (m = 3) QPM structure. See FIG. i for a comparison of the conversion efficiency of first and third order QPM structures to phase matched and non-phase-matched crystals. While a length of crystal equal to an exact even number of coherence lengths would provide no net energy transfer between the initial and the final frequencies, it is possible to make even (or odd) order composite quasi-phase-matched structures, by alternating layers of one nonlinear coefficient with layers of a different or opposite nonlinear coefficient. If the repeatable period is equal to $2ml_c$ where m is an integer, there always will be a net increase in conversion per layer; the quasi-phase-matched order is m. FIG. 2 illustrates two different approaches used to obtain an effective second order quasi-phase-matched structure—a first and third order mix, which is second order, and a first order (m=1) on-off structure which increases at the same rate as the second order structure.

While it is optimal to change the nonlinear coefficient at odd intervals of the coherence length, this is not the only way to achieve conversion. As long as the domain is not exactly equal to an even multiple of the coherence length, there will be some conversion. Domain sizes can be adjusted at the expense of peak conversion efficiency to increase the bandwidth. Aperiodic modulation can also be used for high conversion efficiency.

In this way, we may build a quasi-phase-matched (QPM) structure specifically for the desired interaction. By using GaAs, or other well known crystals, we can capitalize on twenty years of crystal development. QPM can be used to manufacture crystals structures that are useful throughout any range of the electromagnetic spectrum. The main requirements are that the crystals be transparent over the range of the interaction, the crystals have a sufficiently high nonlinear coefficient and damage threshold, and that there be a way to alter the sign of the nonlinear coefficient in a periodic manner at some odd multiple of coherence lengths. Among the benefits of quasi-phase-matching over birefringent phase matching are: large acceptance angles, large temperature and frequency bandwidths, adaptable to any interactions with frequencies in the transparency ranges of the QPM crystal, no birefringence and therefore, no birefringent walk off.

Figure 3:
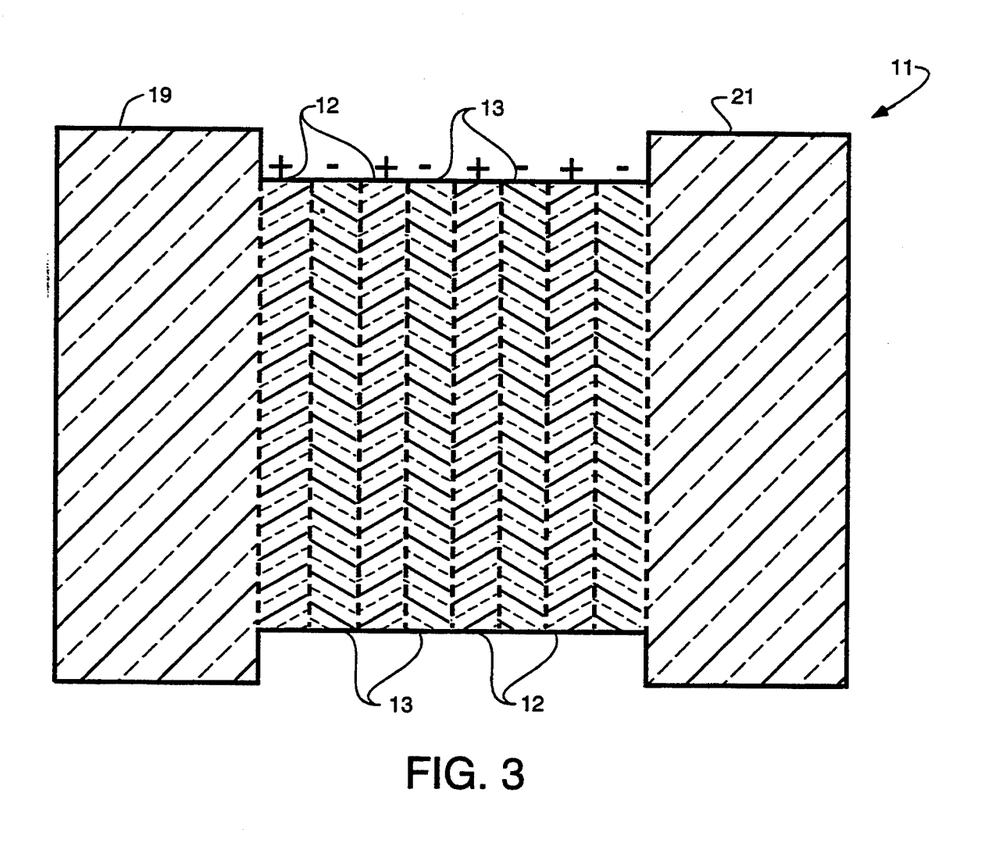
FIG. 3 is an enlarged schematic, elevational view of a preferred embodiment of the invention.

A preferred embodiment of the invention is generally referred to in FIG. 3 by the reference numeral 11. The monolithic body 11 includes a plurality of adjacent wafers 12 and 13 of a nonlinear monocrystalline material, a material which exhibits the well known second order ($\chi^2$) or third order nonlinear ($\chi^3$) interactions with input radiation. A second order interaction response (first order quasi-phase-matching) will be used in this description, although the scope of the invention of course is meant to encompass higher order responses, e.g., third harmonic generation, as discussed above. Due to crystal symmetry, the amplitude of $\chi^3$ is not inverted by a 180° rotation.

The monocrystalline material of each of the wafers preferably is selected to provide indices of refraction having the same or similar numerical values to reduce reflection losses. Diffusion bonded quasi-phase-matching can be achieved, in principle, in any nonlinear crystal. The linear properties of the material may be isotropic or anisotropic. The appropriate crystal must be transparent for the frequencies, preferably is fabricarable into individual plates having thicknesses equal to an odd multiple of coherence lengths for the interaction, and must be diffusion bondable. Some potentially useful materials are certain III-V semiconductors such as GaAs, GaP and InP; II-VI semiconductors for the infrared such as ZnSe, ZnS, CdTe and ZnTe; and I-VII semiconductors such as CuCl and CuBr for use in the ultraviolet. Like materials do not have to be joined to like materials, although to minimize the optical loss and problems due to differential thermal expansion, it is best to join similar materials; however, there are applications where it would be useful to diffusion bond a quasi-phase-matched structure to a substrate of another material for structural integrity, heat dissipation or other reasons.

Gallium arsenide (GaAs) has been found to be a quite suitable material for both wafers 12 and wafers 13. Large diameter, high quality crystals of it can be obtained. Moreover, the characteristics of GaAs are well known and it has a high damage threshold.

Each of the wafers 12 and 13 has a dimension along the expected optical path of the radiation through the same, to optimize the conversion of energy from the input radiation to the desired frequency of output radiation. To provide the requisite quasi-phase-matching component $K_m$ for frequency doubling 10.6 $\mu$m radiation, the thickness of each of the gallium arsenide wafers 12 and 13 is selected to be nominally equal to one coherence length (106 $\mu$m) for input 10.6 $\mu$m radiation which is generally orthogonal to the completed body. In general, though, as mentioned previously, it is the dimension of each of the wafers along the direction of propagation which is to be optimized or, preferably, made equal to an appropriate multiple of the coherence length of the radiation for the desired conversion. This dimension will depend largely on the angle at which the input radiation impinges on the body. Further, the radiation may be focused into the interaction region so as to increase or optimize the nonlinear process according to well known principles of nonlinear optics.

Adjacent wafers 12 and 13 are oriented relative to one another to provide the optimum conversion in accordance with standard quasi-phase-matching techniques. That is, each of the wafers is oriented to change the sign of the nonlinear coefficient. Since the sign is tied to crystal symmetry, in gallium arsenide for a (110) crystal wafer, the layers are oriented relative to one another so that the nonlinear coefficients of adjacent wafers are of opposite sign. That portion of each cycle in which there is an undesired energy transfer will be replaced by a portion of a new cycle with which there is a desired energy transfer.

In keeping with the invention, the mating faces, or in other words, the opposed faces, of adjacent wafers are diffusion bonded together. As stated above, diffusion bonding is the permanent bonding together of opposed surfaces ideally with no foreign substance between them—there is an exchange or sharing of electrons, atoms, ions or molecules. Once diffusion bonded, the resultant structure assumes the physical properties of the bulk material(s). There is no noticeable difference in properties between the bond and the bulk material(s).

Diffusion bonding has been developed and researched in the field of metals, especially steels. Only very recently has there been any work on diffusion bonding in semiconductors: either in silicon and silicon like materials, or GaAs and similar materials (III-V semiconductors). Two papers have been published on the bonding of III-V materials—Z. L. Liau, et al., "Wafer Fusion: A Novel Technique for Optoelectronic Device Fabrication and Monolithic Integration", *Appl. Phys. Lett.*, Vol. 56, No. 8, 19 Feb. 1990; and Y. O. Lo, et al., "Bonding by Atomic Rearrangement in InP/InGaAsP 1.5 mm Wavelength Lasers on GaAs Substrates", *Appl. Phys. Lett.*, Vol. 58, No. 18, 6 May 1991. In both cases, only two wafers were bonded together with the intent of forming optoelectronic devices. Electronic measurements were important to these studies, while the optical properties of the structures were not explored. There certainly is no disclosure in these papers regarding the dimension of adjacent wafers and the combination of diffusion bonding with quasi-phase-matching. Diffusion bonding also has been studied for Nd:YAG crystals. (See "Performance of Composite Glass Slab Laser" by Tajima et al. appearing in the *IEEE J. Quantum Electronics*, Vol. 28, No. 6, Jun. 1992, pp. 1562-1569.) Success has been achieved in building large laser crystals from smaller ones, and the bonding has held up under high power conditions in a laser cavity, demonstrating the high thermal mechanical strength of this type of bonding.

Recently there has been much interest in diffusion bonding between ceramics and metals for industrial and automotive applications. Theory of diffusion bonding has also been extensively treated in this field.

Diffusion bonding is in contrast to the temporary bond which can be achieved via optical contacting commonly used for many purposes in optics. It is superior to optical contacting for quasi-phase-matching for three reasons: a) because it forms a permanent bond, b) because it has no air layer, minimizing any reflection at the interface, and c) because a diffusion bond retains the thermal mechanical properties of the bulk material.

Surface preparation/cleaning and oven atmosphere are important for diffusion bonding. There are four additional important and inter-related parameters: surface flatness, temperature, pressure and time. The better the surface flatness of the layers being joined, the lower the temperature or pressure necessary for the bonding, or the shorter the time it will take to develop an effective bond. To achieve diffusion bonding, adjacent wafers are stacked together, pressure is applied to the stack and the temperature is increased. The increase in temperature must be sufficiently high to cause meaningful migration across the interface while remaining below the melting temperature, i.e., the temperature at which the material being heated will lose its crystalline structure and become a liquid. In the implementation of the instant invention discussed previously with gallium arsenide wafers, the faces of the wafers were first cleaned. That is, the faces were subjected to a hot microdetergent and deionized water solution for 0.5 hours, to hot trichloroethane for 10 minutes, hot acetone for 10 minutes, and then hot methanol for 10 minutes. (A "hot" solution refers to one just under boiling temperature for such solution.) At each stage the faces were scrubbed to remove any residue. After the wafers were blown dry they were packed together with the faces in contact with one another. They were then placed in a boron nitride holder with an additional tungsten weight of 900 grams. The holder with the stack was placed in an oven with a 5% hydrogen atmosphere to inhibit oxidation, with a nitrogen flow of 1 liter per minute to transport any particulate matter. The oven interior was raised to a temperature greater than 500° C., i.e., 820° C. over a period of one hour. It was kept fixed at 820° C. for at least two hours and then allowed to cool for eight hours.

Returning to FIG. 3, the body also included a pair of substrates 19 and 21 at the opposite sides of the wafer structure. A principal purpose of such substrates is to provide end plates whose thicknesses are not important, thus permitting polishing of final surfaces. These substrates can also provide meaningful width dimensions to the final structure and additional mechanical strength. In this connection, the stacked wafers themselves only provide a thickness of about 1 mm for the case of an 10 wafer structure, second harmonic generator for 10.6 $\mu$m radiation. Most desirably each of the substrate structures 19 and 21 has a thickness of at least 0.5 mm and is oriented to avoid nonlinear interaction. Each also is of gallium arsenide and is adhered to the faces of adjacent wafers by diffusion bonding as described above. This will assure that the inclusion of the same will not result in scattering loss at the interface to the remainder of the body. In the implementation of diffusion bonding set forth above, substrates 19 and 21 were included with the stack of wafers when it was subjected to heat and pressure. The resulting structure is a monolithic body of gallium arsenide for transforming input optical radiation to a desired frequency of output optical radiation.

Figure 4:
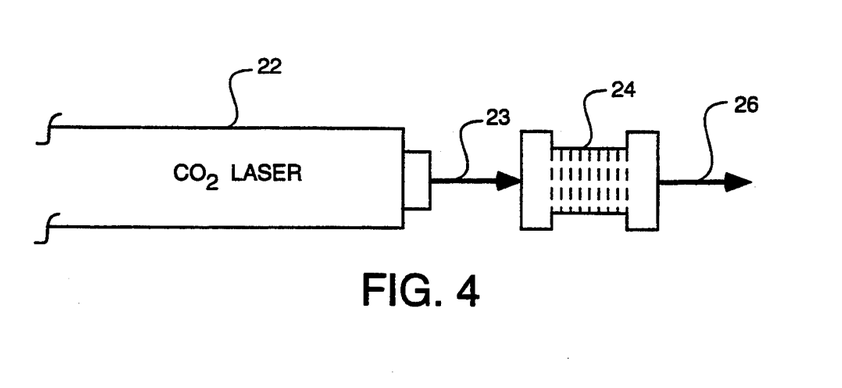
FIG. 4 is an optical generator of the invention.

The invention also includes a generator for producing 5.3 $\mu$m infrared radiation of significant power. With reference to FIG. 4, the generator includes a standard $CO_2$ laser represented at 22 which generates radiation of 10.6 $\mu$m wavelength as represented at 23. This radiation is directed into a monolithic nonlinear crystalline material body 24 meeting the characteristics described above, to convert the same by second harmonic generation to an output radiation having a wavelength of generally 5.3 $\mu$m. This radiation is represented by the arrow 26.

Although the above is an external generator for producing the desired radiation, the invention also includes a generator for internally doubling radiation, e.g., the radiation of a $CO_2$ laser. That is, the monolithic nonlinear crystalline material body may be incorporated directly into the laser cavity. Desirably, it is diffusion bonded in the cavity to the output coupler. The coupler may be highly reflecting for the radiation which would be output except for the invention, i.e., 10.6 $\mu$m radiation in a $CO_2$ laser, but transmitting for the radiation which is desired.

This invention also includes a sum frequency generator for the infrared. Doubled $CO_2$ radiation at 5.3 $\mu$m (30 THZ) is mixed with $CO_2$ radiation at 10.6 $\mu$m (60 THZ). Both frequencies are directed collinearly into a monolithic nonlinear crystalline material body. The input frequencies are converted into an output frequency of wavelength 3.3 $\mu$m (90 THZ).

Figure 5A:
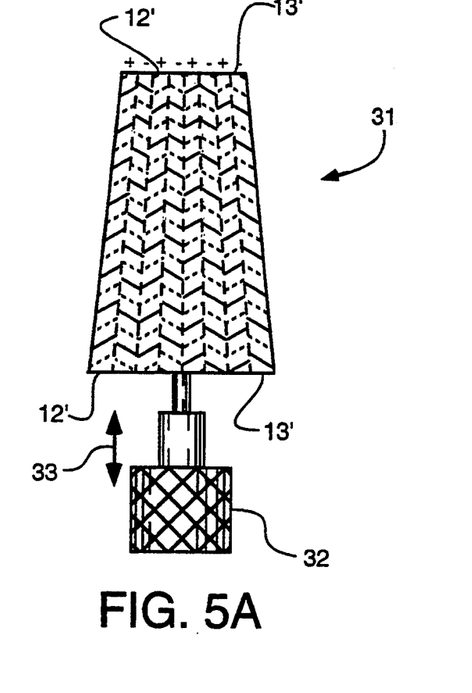
FIGS. 5A and 5B are alternate preferred embodiments of the invention.
Figure 5B:
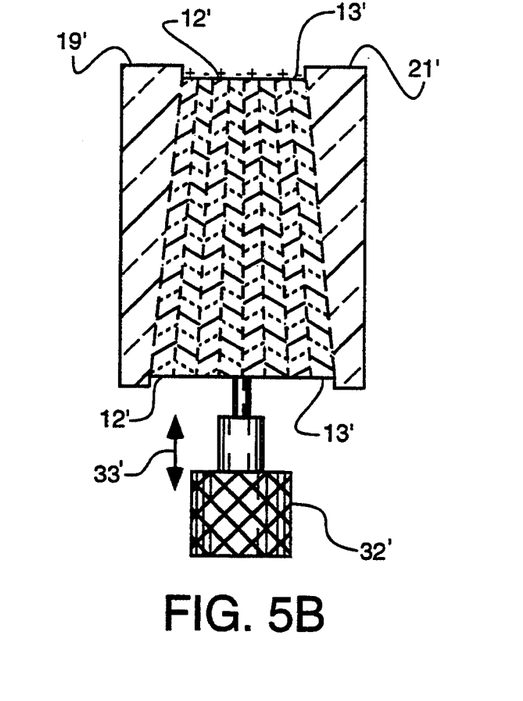

As mentioned previously, the dimension of each of the wafers is tailored dependent upon the expected path length of the radiation of interest therethrough. FIGS. 5A and 5B illustrate embodiments of the invention in which this dimension is changeable relative to the input radiation direction in order to allow output tuning. As will be discussed, the embodiments of these figures are particularly important in that they show configurations suitable for 2 micron pumped optical parametric oscillators (OPOs) that can be tuned. Previously, wedged domains have been built in QPM waveguides to compensate for design uncertainties and fabrication errors, but they have not been considered for a bulk structure.

With reference to FIG. 5A, each of the wafers 12' and 13' is wedge shaped, i.e., it varies uniformly in thickness in the direction of the expected path length. Moreover, the wafers are oriented together to match the variations and thereby provide a wedge configuration for the body, which body is generally referred to in the figure by the reference numeral 41. Means are also included for translating the wedge configuration relative to input optical radiation. That is, the body 41 is connected axially to a micrometer at 32 so that it can be selectively translated in the directions represented by arrow 33. Thus, if the angle and position of the input radiation is maintained static, the width of the material can be varied to match the radiation as desired. Although a micrometer is included for moving the wedge configuration, it will be appreciated that the means for translating the wedge configuration relative to the input radiation could move the source of the input radiation instead. The arrangement in FIG. 5B differs from the arrangement shown in FIG. 5A only in that substrates 19' and 21' are included.

Figure 6:
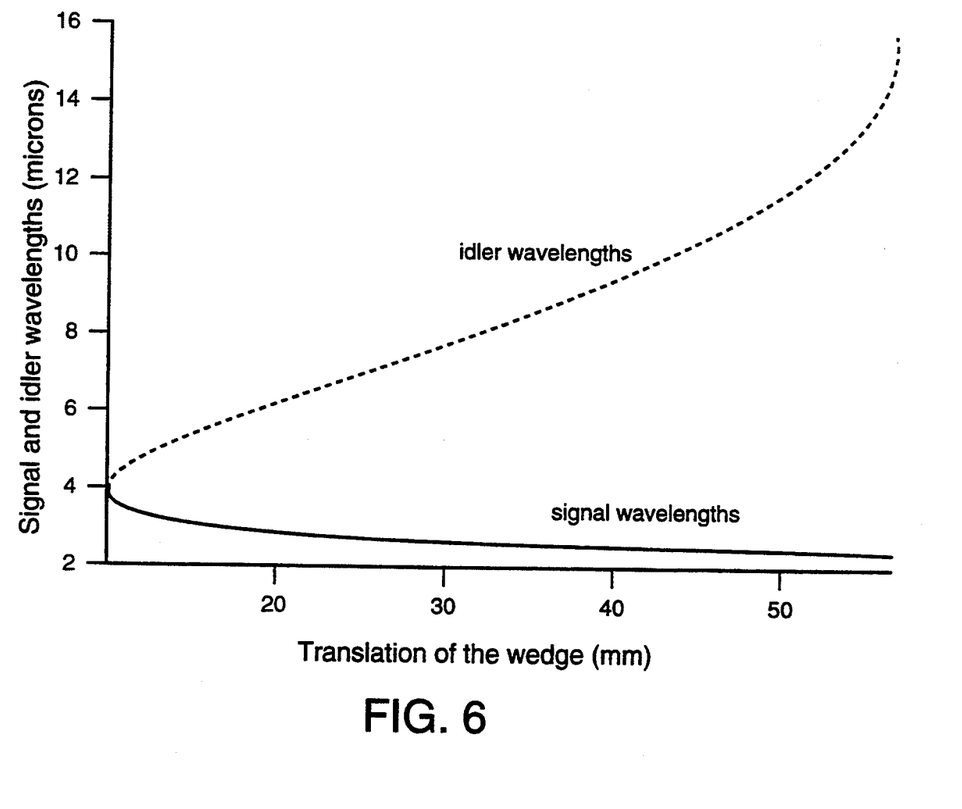
FIG. 6 is a graphical view of a tuning curve for a diffusion bonded, quasi-phase-matched (DB-QPM) wedge structure of the invention.

This invention also includes a tunable optical parametric oscillator, built using the wedged diffusion bonded, quasi-phase-matched (DB-QPM) structure. The oscillator includes a standard source (laser or OPO) which generates radiation at about 150 THZ (2 $\mu$m wavelength). This radiation is directed into the wedged monolithic nonlinear crystalline material body, to convert the input radiation into output radiation of two frequencies such that $(\omega_1)_{in}=(\omega_2+\omega_3)_{out}$. The frequency pairs, $\omega_2$ and $\omega_3$, are chosen/tuned by translating the oscillator perpendicularly relative to the direction of propagation. A tuning curve for the oscillator is shown in FIG. 6. The device is made by varying the thickness of the wafer from 70 $\mu$m to 120 $\mu$m over a possible translation range of 60 mm. This corresponds to third order quasi-phase-matching for this interaction.

Figure 7:
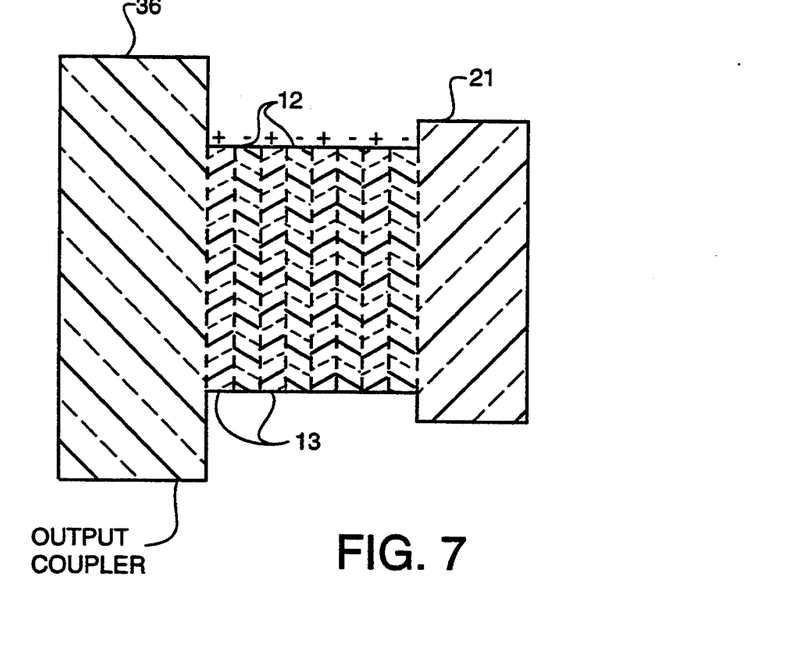
FIG. 7 is an enlarged schematic view showing a preferred embodiment of the invention, including the combination of both a monolithic monocrystalline material and another optical device.

In some instances it is practical to provide the monolithic nonlinear crystalline body of the invention directly on, or as a part of, another optical device to which the radiation is subjected. One advantage of doing so is that there is at least one interface which is eliminated. FIG. 7 illustrates an arrangement in which the substrate 19 is replaced by an output coupler 36 of a laser or the like which generates the optical radiation. Thus, the output coupler integrates the nonlinear device into the laser itself. Most desirably, the wafer structure is bonded to the output coupler or other optical device by diffusion bonding. This will eliminate the interfaces which normally would separate the body of the invention from other optical devices within the optic path and will provide mechanical support and a thermal conduction path for high average power applications. As discussed above, the monolithic nonlinear crystalline body of the invention can be placed on an optical coupler internally of a laser cavity, rather than externally as shown in FIG. 7.

Below is a divided table comparing the performance of two diffusion bonded, quasi-phase-matched (DB-QPM) materials, GaAs and ZnSe, to two birefringently phase matched materials, ZnGeP$_2$ and AgGaSe$_2$. They were all compared for doubling CO$_2$ radiation at 10.6 $\mu$m (30 THZ) to 5.3 $\mu$m (60 THZ). The constants for these calculations were taken from a wide variety of sources and were selected as deemed appropriate. Because measurement techniques are being continually improved, the table is not meant as a source of absolutes but rather as an indicator of comparable trends. AgGaSe$_2$ is critically phase matched, while ZnGeP$_2$ is non-critically phase matched. Both DP-QPM materials are non-critically phase matched. The much wider acceptance bandwidths are apparent in the DB-QPM materials. The four figures of merit demonstrate usability in different situations. The first two show the performance for continuous and pulsed operation, respectively; the third shows optical distortion; and the fourth, a figure of merit for high average power conversion.

Second Harmonic Generation of 10.6 $\mu$m Radiation for a 1 cm Long Crystal

| crystal | DB-QPM GaAs | DB-QPM ZnSe | ZnGeP$_2$ | AgGaSe$_2$ |
|---|---|---|---|---|
| transmission range ($\mu$m) | 0.9–12 | 0.5–14 | 0.7–12 | 0.7–12 |
| d (pm/V) | 83 | 50 | 70 | 33 |
| $\alpha$ (cm$^{-1}$) | 0.01 | 0.0005 | 1 | 0.01 |
| K$_{therm}$ (W/mK) | 52 | 18 | 35 | 1 |
| dn/dT · 10$^6$ (K$^{-1}$) | 149 | 64 | dd$_o$/dT = 150<br>dn$_e$/dT = 170 | dd$_o$/dT = 70<br>dn$_e$/dT = 40 |
| d$\Delta$n/dT · 10$^6$ (K$^{-1}$) | 1.6 | 0.7 | 20 | 30 |
| n$_\omega$ | 3.271 | 2.403 | 3.125 | 2.592 |
| n$_{2\omega}$ | 3.296 | 2.429 | 3.125 | 2.592 |
| (degrees) | — | — | — | 0.68 |
| $\theta_{pm}$ (degrees) | — | — | 90 @ T = 92° C. | 55 |
| d$_{eff}$ (pm/V) | 61 | 37 | 70 | 27 |
| $\Delta\lambda$ ($\mu$m) | 0.48 | 0.2 | 0.06 | 0.12 |
| $\Delta\Theta_{int}$ (degrees) | 16 | 15 | 12 | 0.8 |
| $\Delta$T (K) | 270 | <500 | 16 | 15 |
| FOM$_{cw}$ | 6500 | 2400000 | 1 | 2600 |
| FOM$_p$ | 2.5 | 2.3 | 3.8 | 1 |
| FOM$_{od}$ | 160 | 2400 | n$_o$ axis = 1.1<br>n$_e$ axis = 1.0 | n$_o$ = 6.9<br>n$_e$ = 12 |

-continued

Second Harmonic Generation of 10.6 μm Radiation for a 1 cm Long Crystal

| crystal | DB-QPM GaAs | DB-QPM ZnSe | ZnGeP$_2$ | AgGaSe$_2$ |
|---|---|---|---|---|
| FOM$_{hp}$ | 44600 | 27500 | 1 | 14 | d = nonlinear coefficient of the crystal
α = absorption coefficient of the crystal
K$_{therm}$ = thermal conductivity of the crystal
dn/dT = change in index of refraction as a function of temperature; the birefringent crystals have two different indices of refraction
dΔn/dT = Δn = n$_2$ − n$_1$; change in the difference of index of refraction as a function of temperture
n$_ω$ = index of refraction at 10.6 μm
n$_{2ω}$ = index of refraction at 5.3 μm
ρ = walkoff angle
Θ$_{pm}$ = phase matching angle measured from the optical axis. DB-QPM structures have no optical axis
d$_{eff}$ = effective nonlinear coefficient taking into account the angle of propagation and quasi phase matching
Δλ = the acceptance bandwidth for wavelengths
ΔΘ$_{int}$ = the acceptance bandwidth for angles (this is the internal angle in the crystal)
ΔT = the acceptance bandwidth for temperatures
NB. for Figures of Merit. They have all been normalized to the lowest value.
FOM$_{cw}$ = Figure of Merit for a continuous laser: FOM$_{cw}$ = d$_{eff}^2$/n$^3$α$^2$
FOM$_p$ = Figure of Merit for a pulsed laser: FOM$_p$ = d$_{eff}^2$/n$^3$
FOM$_{od}$ = Figure of Merit for optical distortion: FOM$_{od}$ = K$_{therm}$/αdn/dT
NB For birefringent crystals, we indicate the optical distortion Figure of Merit for the two different axes.
FOM$_{hp}$ = Figure of Merit for high average power performance: FOM$_{hp}$ = d$_{eff}^2$K$_{therm}$/αn$^2$dΔn/dT A diffusion bonded quasi-phase matched structure has many advantages for high average power application. This is important for high average power nonlinear devices especially in the infrared region. Currently there is no acceptable high power second harmonic generator, or other mid-infrared nonlinear optic device for CO$_2$ lasers. There is a great deal of interest in developing mid infrared sources, between 3 to 5 microns, either by doubling CO$_2$ lasers or by pumping an optical parametric oscillator (OPO) with 2 microns. Both of these goals can be accomplished with diffusion bonded quasi-phase-matched GaAs structures.

Some of the qualities which make these structures interesting for high average power applications are: a) the possibility of using high average power, low absorption crystals which have little or no birefringence, b) the thin size of the structure itself, and c) the thermal mechanical strength of the diffusion bond which will be identical to that of the bulk material. A diffusion bonded quasi-phase-matched GaAs structure with a conversion efficiency of greater than 50% can be built with a total thickness of approximately 1 mm. This thinness has a twofold benefit; it is more easily cooled and has a much lower absorption than a similar thicker sample. Birefringently phase matched crystals such as AgGaSe$_2$ and AgGaS$_2$ which are currently used for mid infrared devices have poor thermal conductivity and, therefore, do not handle high average power well.

Because of the nature of the structure, there are a few special properties that are worthy of mention. There is a large bandwidth of acceptance; this permits the same device to be used for similar but slightly different frequencies. This also means that the device can track frequency fluctuations in one source. Diffusion bonded structures for quasi-phase-matching (DB-QPM structures) also have a large temperature and a angular acceptance. This provides a built-in tolerance of temperature fluctuations and alignment. If there is no birefringence in the basic crystal, then there will be no birefringence walkoff.

As mentioned at the beginning of the detailed description, applicant are not limited to the specific embodiments described above. Various changes and modifications can be made. For example, although the preferred embodiments of the invention have been described as if the angle of the input optical radiation relative to the monolithic body is static, it is contemplated that in many instances it will be desirable to vary the angle for tuning and/or to make a single body applicable to optical radiation of differing wavelengths. Variations of this nature can be combined, for example, with the embodiments of FIGS. 5A and 5B. It also should be noted that in some instances the change of frequency can include a change in bandwidth. The claims, their equivalents and their equivalent language define the scope of protection.

What is claimed is:

1. In a method of producing radiation of a selected frequency from input radiation, the steps of:

(a) providing a monolithic nonlinear monocrystalline material made up of a plurality of wafers of nonlinear monocrystalline material which are diffusion bonded together, which wafers individually have a dimension along an expected optical path through the same selected to provide a desired conversion of energy from said input radiation to output radiation at a selected frequency, said wafers being oriented in said material to optimize the desired conversion of radiation from said input radiation to said selected frequency; and said monolithic nonlinear crystalline material being selected from the group consisting of GaAs, GaP, InP, ZnSe, CdTe, ZnTe, CuCl, and CuBr; and (b) passing input radiation through said monolithic nonlinear monocrystalline material to provide output radiation having said selected frequency via a nonlinear interaction.

2. The method of claim 1 wherein said radiation is optical radiation.

3. The method of claim 2 wherein said step of passing includes the step of directing optical radiation having a frequency of about 30 THZ into said material.

4. In a method of producing radiation of a selected frequency from input radiation, the steps of:

(a) providing a monolithic nonlinear monocrystalline material made up of a plurality of wafers of nonlinear monocrystalline material which are diffusion bonded together, which wafers individually have a dimension along an expected optical path through the same selected to provide a desired conversion of energy from said input radiation to output radiation at a selected frequency, said wafers being oriented in said material to optimize the desired conversion of radiation from said input radiation to said selected frequency and said material being gallium arsenide (GaAs); and (b) passing input radiation through said monolithic nonlinear monocrystalline material to provide output radiation having said selected frequency via a nonlinear interaction.

5. A monolithic nonlinear crystalline material for the transfer of energy from input radiation to a selected converted frequency of output radiation, comprising a plurality of adjacent wafers of a nonlinear monocrystalline material that are diffusion bonded together, which wafers individually have a dimension along an expected optical path through said wafer selected to optimize the conversion of energy from said input radiation to said converted frequency of output radiation, adjacent wafers being oriented relative to one another to optimize said conversion also in adjacent wafers, the material of each of said wafers being cubic and selected from the group consisting of GaAs, GaP, InP, ZnSe, ZnS, CdTe, ZnTe, CuCl, and CuBr.

6. The monolithic nonlinear crystalline material of claim 5 wherein both said input radiation and said output radiation are optical radiation.

7. The monolithic nonlinear crystalline material of claim 6 wherein said dimension of each of said wafers along said expected optical path through the same is generally equal to an odd multiple of the coherence length for the desired conversion from said input optical radiation to said output optical radiation.

8. The monolithic nonlinear crystalline material of claim 7 wherein said dimension is generally equal to one coherence length.

9. The monolithic nonlinear crystalline material of claim 7 wherein the material of each of said wafers is the same as that of the other wafers.

10. The monolithic nonlinear crystalline material of claim 5 wherein said material is gallium arsenide (GaAs).

11. The monolithic nonlinear crystalline material of claim 5 wherein nonlinear coefficients of all of said wafers have generally the same numerical values but adjacent wafers are of different signs.

12. The monolithic nonlinear crystalline material of claim 5 further including a substrate to which a face of one of said wafers is adhered by diffusion bonding.

13. The monolithic nonlinear crystalline material of claim 12 wherein said face is at one side of said monolithic material, and a second substrate is adhered to the face of a wafer at the opposite side of said material.

14. The monolithic nonlinear crystalline material of claim 13 wherein both of said substrates are adhered to their respective wafer faces by diffusion bonding.

15. A monolithic nonlinear crystalline material for the transfer of energy from input radiation to a selected converted frequency of output radiation, comprising a plurality of adjacent wafers of a nonlinear monocrystalline material that are diffusion bonded together, which wafers individually have a dimension along an expected optical path through said wafer selected to optimize the conversion of energy from said input radiation to said converted frequency of output radiation, adjacent wafers being oriented relative to one another to optimize said conversion also in adjacent wafers; and wherein each of said wafers varies uniformly in thickness in the direction of said expected path length, and said wafers are oriented together to match said variations in thickness and thereby provide a wedge configuration; and means are included for translating said wedge configuration relative to input radiation.

16. A monolithic nonlinear crystalline material for the transfer of energy from input radiation having a selected input angle to said material to a selected converted frequency of output radiation, comprising a plurality of adjacent wafers of a nonlinear crystalline material that are diffusion bonded together, each of which wafers individually has a dimension along an expected optical path through said wafer selected to optimize the conversion of energy from said input radiation to said converted frequency and varying uniformly in thickness in the direction of said expected path length, adjacent wafers also being oriented relative to one another to optimize said conversion and match said variations in thickness and thereby provide a wedge configuration; and means for translating said wedge configuration relative to said input angle of said input radiation.

17. The monolithic nonlinear crystalline material of claim 16 wherein the crystalline material of each of said wafers is cubic.

18. The monolithic nonlinear crystalline material of claim 17 wherein the material of each of said wafers is selected from the group consisting of GaAs, GaP, InP, ZnSe, CdTe, ZnS, ZnTe, CuCl, and CuBr.

19. The monolithic nonlinear crystalline material of claim 16 wherein said material is gallium arsenide (GaAs).

20. In a method of fabricating a monolithic nonlinear crystalline material for the transfer of energy from input radiation to a selected converted frequency of output radiation, the steps of:

(a) providing a plurality of wafers of a nonlinear cubic crystalline material selected from the group consisting of GaAs, GaP, InP, ZnSe, CdTe, ZnS, ZnTe, CuCl, and CuBr, which wafers individually have a dimension along an expected optical path through said wafer selected so that said plurality will optimize the conversion of energy from said input radiation to said converted frequency;

(b) orienting said wafers in a stack to optimize said conversion in adjacent wafers; and (c) diffusion bonding adjacent wafers together to form said monolithic nonlinear crystalline material.

21. The method of claim 20 wherein both said input and said output radiation is optical radiation.

22. The method of claim 20 wherein the dimension of each of said wafers along said expected optical path through the same is generally equal to an odd multiple of the coherence length in said wafer for the desired conversion from said input radiation to said output radiation.

23. The method of claim 22 wherein said dimension is generally equal to one coherence length.

24. The method of claim 22 wherein said material is gallium arsenide (GaAs), and the temperature used in said diffusion bonding is greater than about 500° C.

25. The method of claim 20 wherein said step of diffusion bonding further includes the step while said wafers are maintained mated with one another, of raising the temperature of said wafers to a temperature which causes meaningful migration of electrons, atoms, ions or molecules at the interface between adjacent wafers without destroying the crystalline nature of such wafers.

26. A generator of optical radiation comprising:

(a) a carbon dioxide ($CO_2$) laser for generating optical radiation having a frequency of about 30 THZ;

(b) a monolithic nonlinear crystalline material made up of a plurality of adjacent wafers of gallium arsenide (GaAs) which are diffusion bonded to one another, each of said wafers having a dimension along an expected optical path through the same of said radiation which is generally equal to an odd multiple of coherence lengths in said material of said radiation, adjacent ones of said wafers being oriented relative to one another to have opposite signs of nonlinear susceptibility;

thereby forming a monolithic nonlinear crystalline material which transfers the energy from said 30 THZ radiation to generated radiation having a frequency of generally about 60 THZ.

27. A monolithic body of gallium arsenide (GaAs) for the transfer of energy from input optical radiation to a selected converted frequency of output optical radiation, comprising a plurality of adjacent wafers of gallium arsenide (GaAs) which are diffusion bonded together, each of said wafers having a dimension along an expected optical path therethrough generally equal to an odd multiple of the coherence length in said wafer for said frequency, it being the opposed faces of adjacent wafers which are diffusion bonded together to form said body.

28. The body of claim 27 wherein said dimension of each of said wafers is generally equal to one coherence length.

29. The body of claim 27 wherein adjacent ones of said wafers are oriented relative to one another to have opposite signs of nonlinear susceptibility.

30. In a method of producing radiation of a selected frequency from input radiation by optical parametric oscillation, the steps of:

(a) providing a monolithic nonlinear monocrystalline material made up of a plurality of wafers of nonlinear monocrystalline material which are diffusion bonded together, which wafers individually have a dimension along an expected optical path through the same generally equal to three multiples of the coherence length in said wafer for the desired conversion and each of which varies uniformly in thickness in the direction of said expected path length, said wafers being oriented in said material both to optimize conversion of radiation from an input radiation to said selected frequency and to match said variations in thickness and thereby provide a wedge configuration;

(b) passing input optical radiation through said monolithic nonlinear monocrystalline material to provide output optical radiation via a nonlinear interaction; and (c) translating said wedge configuration relative to said input radiation to provide output radiation having the desired frequency.

* * * * *